United States Patent [19]

Fritchie et al.

[11] Patent Number: 4,974,080

[45] Date of Patent: Nov. 27, 1990

[54] SIGNAL GENERATOR WITH DISPLAY AND MEMORY CARD

[75] Inventors: Ben Fritchie, Oregon City; Mark Wendt, Beaverton, both of Oreg.

[73] Assignee: Magni Systems, Inc., Beaverton, Oreg.

[21] Appl. No.: 365,852

[22] Filed: Jun. 13, 1989

[51] Int. Cl.⁵ ............................................ H04N 17/00
[52] U.S. Cl. ...................................... 358/139; 358/10
[58] Field of Search ............... 358/139, 10; 324/73 R; 328/187, 188

[56] References Cited

U.S. PATENT DOCUMENTS

| | | | |
|---|---|---|---|
| 2,963,652 | 12/1960 | Taylor | 358/139 |
| 3,751,582 | 8/1973 | Wernikoff | 358/903 |
| 3,792,195 | 2/1974 | Wilson | 358/139 |
| 4,322,749 | 3/1982 | Weston | 358/139 |
| 4,408,337 | 10/1983 | Van Cang | 358/139 |

*Primary Examiner*—Howard W. Britton
*Attorney, Agent, or Firm*—Flehr, Hohbach, Test, Albritton & Herbert

[57] ABSTRACT

A video test signal generator system with removable memory card and display provides a combination of a front panel display and a removable memory card in a video test signal generator. The memory card allows a user to program the generator in a number of configurations never before possible. The removable memory card can be used to store signal data which is used by the generator in producing test signals, signal selectio protocol and status information which is printed on the front panel display to indicate the generator settings.

4 Claims, 3 Drawing Sheets

SIGNAL GENERATOR WITH DISPLAY AND MEMORY CARD

BACKGROUND OF THE INVENTION

The present invention relates to a video test signal generator system with memory card and display.

Video test signal generators in the prior art usually have a configuration wherein the user manually reenters information each time the generator is reconfigured to any allowable status. The user must therefore remember the details of setup each time a change is needed.

It would be very desirable, therefore, to provide an improved test signal generator system which eliminates the need for a user to manually reconfigure the generator for each change.

SUMMARY OF THE INVENTION

The object of the present invention is to provide an improved video test signal generator system with display and a removable memory card.

The present invention provides a combination of a front panel display and a removable memory card in a test signal generator. The memory card allows the user to program the generator to perform functions in a number of configurations never before possible.

The removable card is used to store and recall signal data and set up informations. This is used by the generator in producing test signals, signal selection protocol, set up criteria and status information, which is printed on a front panel display to indicate the generator settings. The display can be programmed to provide an English text description of the generator status as opposed to previous generators which have only cryptic LED indicators and numeric characters.

Other obbects, and advantages of the present invention will become apparent from the following detailed description when taken in conjunction with the accompanying drawings.

BRIEF DESCRIPTION OF THE DRAWINGS

The accompanying drawings which are incorporated in and form a part of this specification illustrate an embodiment of the invention, and other with the description, serve to explain the principles of the invention.

DETAILED DESCRIPTION OF THE INVENTION

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
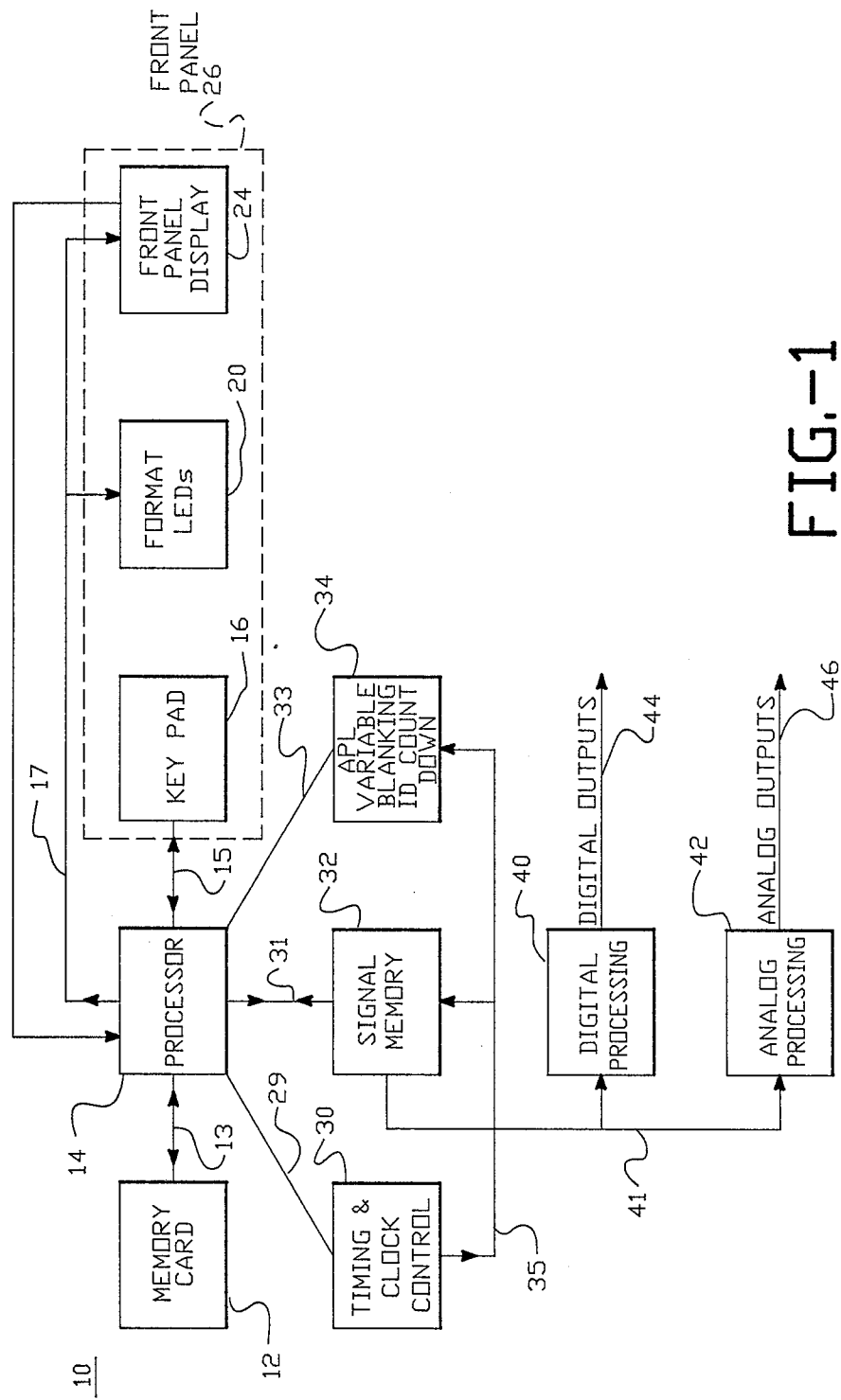
FIG. 1 depicts a block diagram of a test signal generator according to the present invention.

Referring now to FIG. 1, a block diagram of a video test signal generator 10 according to the present invention is depicted.

In system 10, removable card 12 interconnects with a processor 14 through communication bus 13. Processor 14 interconnects to a keypad 16 through communication bus 15. Processor 14 also connects to format LEDs 20 and front panel display 24 through bus 17.

The system 10 also includee a timing and clock control 30 which receives suitable control signals from processor 14 via bus 29.

The system 10 also includes a memory 32 and variable blanking ID countdown circuit 34 which receives suitable timing and clock control signals via bus 35 from clock control 30.

Memory 32 also interconnects to processor 14 through bus 31 and countdown circuit 34 connects to processor 14 through bus 33.

System 10 also includes a digital processing circuit 40 connected to memory 32 via bus 41 to provide digital outputs on bus 44.

Similarly, the system 10 includes an analog processor 42 connected to memory 32 via bus 41 to provide analog outputs on bus 46.

This invention pertains to the combination of front panel display 24 and a removable memory card 12 in a test signal generator 10. The memory card 12 allows a user to program the generator 10 to perform functions in a number of configurations never before possible.

The removable memory card 12, either in the form of a write once memory or erasable, reprogrammable memory, is used to store and recall: (A) signal data which is used by the generator 10 in producing test signals, (B) signal selection protocol, (C) set up criteria, and (D) status information which is printed on the front panel display 24 to indicate the generator settings. This information can either be programmed within the generator through processor 14 via bus 13, or programmed outside the generator by a different means.

The display 14 is used to give an English or other text of the generator status as opposed to previous generators, which have only cryptic LED indicators and numeric characters.

(A) The signal includes pre-digitized data points used to directly construct an image of the signal in the generator's memory 32. Alternately, signal data can consist of a description of the signal from which digitized data points can be computed.

Associated with the signal data described above is a textual annotation which describes the intended use(s) of the test signal and is displayed on the readout 24 when the signal is selected or if information on the signal is requested.

(B) The signal selection protocol described above includes a list of all the available signals organized by format and functionally similar groups. This gives a layered structure which can be traversed for signal selection. Alternately, each signal can be accessed entering a unique number from the keypad 16. This allows direct Upon selection of a signal by either of the methods described above, the generator 10 will indicate which signal(s) is being generated by printing its name and description on the readout of Front Panel Display 24.

(C) Instructed by the signal selection protocol, the set up criteria provides information for the generators to configure its hardware switching and software selection.

This information is the key to the full implementation of the generator to perform functions in one or more configurations or video signal standards.

(D) The status information of described above includes system timing relative to both reference inputs, trigger output selection, identification text, format and frequency selection, vertical field split information, master oscillator adjustment, and memory settings.

System timing includes a value of timing reference used to adjust the timing offset of generated signal to the reference signal. There are two independent reference signal inputs and a reference timing setting for each. This allows the generator 10 to be in time with either one of two external signals without the user having to change connectors. The two input references may or may not be of the same format.

The trigger output selection can be one out of a set of possible signals. The signal used as trigger output is stored on the memory card 12.

The Identification text or ID is text which appears in a window in the output signal. It is used for station identification, this message is also stored on the memory card 12.

The vertical field split information which determines the vertical field split information which determines where one signal ends and another begins in the field is stored on the memory card 12.

Memory settings are stored packets of status information. These memories can be recalled to completely reconfigure the generator 10 to any allowable status. These memories can be recalled by pressing a sequence of keys from the keypad 16 or by receiving a memory recall message from a remote control connector.

In other instruments of this nature, the configuration must be reentered manually for each change. The user must therefore remember the details of setup each time a change is needed. This generator 10, upon insertion of a memory card 12, automatically configures itself to the stored generator state found on the memory card 12. This eliminates the need for the user to manually reconfigure the generator 10 each time a different memory card is used.

Memories are also used to allow multiple generator settings to be stored on a single memory card 12. This allows the user to quickly change the generator setup to one of a set of predefined states.

All of the status information stored on the memory card 12 is user programmable and may be changed by the user from the generator itself. The user may change items by invoking the setup menu from the buttons on Key Pad 16 on front panel 26 and then following a series of steps which are displayed on the readout 24. All items of status information may also be modified via the remote control connector. This is done by connecting the serial port connector of a computer or terminal to the generator. Setup commands are then transmitted to the generator 10 using the control language. This allows a user to keep a file of generator setups on a computer and then download them as needed.

Methods of signal selection:

Actual signal selection is accomplished in one of four ways. The front panel buttons and display 24 can be used to navigate through a layered signal directory organized as a layered menu. A number precedes each choice shown on the display 24, and when pressed selects that choice. The top layer is the system format and may list several choices such as NTSC, PAL and GBR. Since one of these is selected, the next layer may be signal grouping such as FREQUENCY RESPONSE or NOISE TEST. The final layer is a list of the actual signals themselves. These may be grouped in pages which may be leafed through. Again, each signal had a number associated with it which, when pressed, selects that signal.

The second method of signal entry is a shortcut of the above method. The exact sequence of number pressed to get to the signal as described above can be entered all at one time and then the select button is pressed. This will produce the same signal as entering each number separately and pressing select after each number, as specified above.

The third method of signal entry is for user to program the signal along with generator setups under a single button operation. This will allow changing formats and lock operation with single button. This information is stored in the removable memory card enabling the user to program multiple single button operations as a definable function key.

The fourth method of signal selection is to use a computer or terminal connected to the generator via the serial port method one or two described above can then be followed to select a signal.

These four methods of signal selection give a maximum of flexibility to the user in selecting a signal. Method one gives sufficient detail for the occasional user to easily select a signal, and method two is a shortcut method for the experienced operator who is familiar with the generator's operation.

Method three allows user to configure signal selection for quick and routine operation of limited selections.

Method four allows the remote or automated operation of the generator as may be needed in a production environment.

Variable Average Picture Level (APL) with Variable Blanking width:

Extended testing capability is made available for signals with variable APL with variable blanking width. Varying the blanking width allows testing of blanking circuits, pedestal insertion, and allows the user to verify blanking widths of other signals by using the A-B mode of a waveform monitor. The blanking width is selected from the front panel by choosing the setup menu and entering a blanking time in microseconds.

The APL level is a signal is usually fixed at one of two levels. In this invention, the operator can vary the signal APL level from all levels between black level to white level. This allows greater flexibility in checking systems that may have exhibited complex sensitivity to APL than can be detected with current generators with fixed level or limited variable level APL. The APL level is selected from the front panel by choosing the setup menu and entering an APL percentage.

Dual Timing Sets for Two External Reference Inputs:

Operators frequently have a need for a generator that can be easily timed to two different studios or addressed to two different standards.

This generator, according to the present invention, has two external reference inputs. Each reference input has a unique timing set. The timing of the generator output relative to an external reference is set by the user through the front panel display 24. The unique timing settind gor each reference input is stored in memory card 12 for later recall when the specific reference input is selected.

The generator 10 also provides for multiple frequency settings on a reference oscillator. The frequency settings can also be related to a specific reference input.

Figure 3:
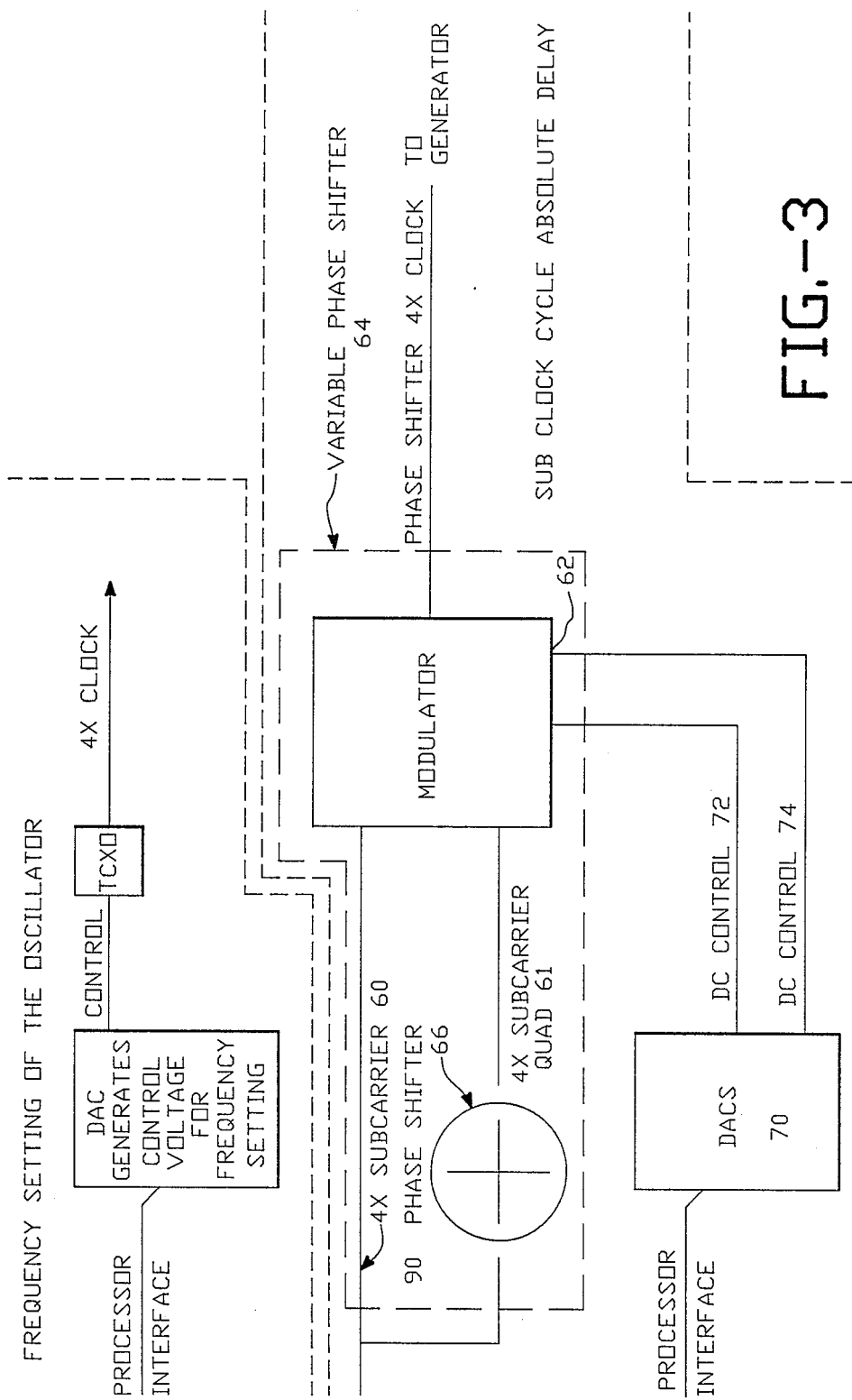
FIG. 3 depicts a subclock cycle delay diagram utilized by the system of FIG. 1.

The sub-clock cycle incremental timing adjustment is achieved by the use of a variable phase shifter 64 shown in FIG. 3, which consists of fixed 90 degree phase shifter 66 and modulator 62. In this generator, the circuit of FIG. 3 is used for absolute timing adjustment of the generator output. The clocks that are input to modulator 62 are 4X subcarrier 60 or 4X line related frequency in addition to a 4X subcarrier Quad 61, that is time shifted by 90 degrees from 4X subcarrier 60. The variable DC control voltages 72, 74 in this generator are created by digital-analog converters 70 which are under processor control from the front panel 26 of FIG. 1 with respect to the specific reference input or phase shift specified.

Signal Memory 32:

The signal memory 32 in the generator 10 of FIG. 1 can be configured to generate composite, component and digital outputs in both 525 and 625 standards. The dual standard capability is possible due to dual standard counter which generator the addressing for the signal memory 32. Multiple formats can also be configured.

The analog processing enables gain and DC offset to be stored for the signal being generated at analog output 46.

Figure 2:
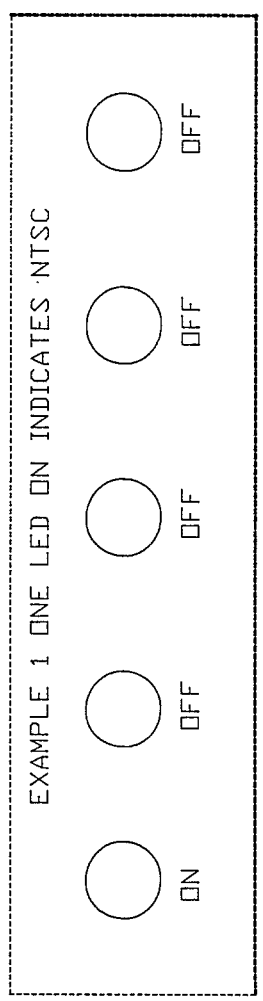
FIGS. 2A and 2B depict a diagram or format display examples as utilized by the system of FIG. 1.
Figure 2:
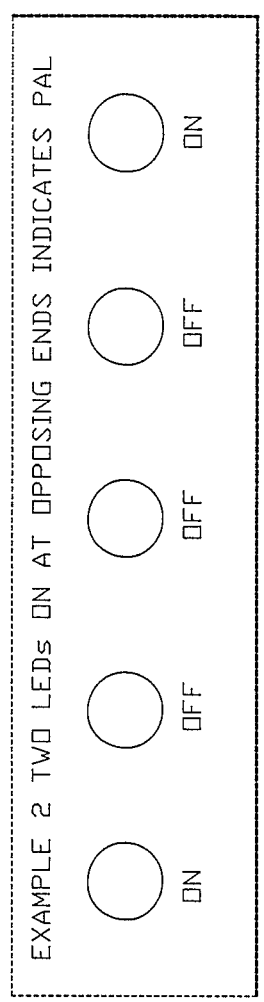

Format Display 20:

It is sometimes difficult for an operator to determine at a glance the current format of a generator output. To assist in this determination, multiple LEDs on format LEDs 20 on the front panel 26 indicate the current format of the generator output. Five LEDs are used in a preferred embodiment, as shown in FIG. 2. The lighting of specific combinations indicate a specific format and provides distinctive spatial indications for different formats enable the user to determine the format even when the generator is located some distance from the operator.

Programmable Field Splits from the Display and Memory Card

It is desirable for the operator to have the ability to control the location in the field where certain signals will occur. In the past, this location was fixed and not alterable by the operator. This generator allows the user to enter the desired location in the field and the specific signal that will occur. This information can be entered from the front panel display 24, or a previously stored configuration can be recalled from the memory card 12.

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. A video test signal generator comprising
   front panel means including a front panel display,
   removable memory means for storing signal data for producing test signals, signal selection protocol and status information,
   said front panel means including means for printing said status information on said front panel display.

2. A generator as in claim 1 including keypad means for entering changeable user configurations to or from said removable memory means.

3. A generator as in claim 1 including format LED display means for displaying changeable LED means to indicate the current format of the output of said generator.

4. A generator as in claim 2, wherein said removable memory means includes single button operation means for enabling users to configure stored multiple generator settings and signals to be recalled.

* * * * *